United States Patent [19]

Ueda et al.

[11] Patent Number: 4,952,052
[45] Date of Patent: Aug. 28, 1990

[54] MICROFILM READER FOR MICROFICHE FILMS

[75] Inventors: Nobuo Ueda; Hideaki Hirasawa, both of Osaka, Japan

[73] Assignee: Minolta Camera Kabushiki Kaisha, Osaka, Japan

[21] Appl. No.: 191,136

[22] Filed: May 6, 1988

[30] Foreign Application Priority Data

May 8, 1987 [JP] Japan .................................. 62-112784
May 8, 1987 [JP] Japan .................................. 62-112785
May 8, 1987 [JP] Japan .................................. 62-112786

[51] Int. Cl.⁵ .............................................. G03B 23/08
[52] U.S. Cl. .................................. 353/27 R; 353/101; 353/23
[58] Field of Search ............... 353/25, 27 R, 27 A, 353/22, 23, 24, 101

[56] References Cited

U.S. PATENT DOCUMENTS 3,885,867  5/1975  Nelson et al. .
3,926,426 12/1975  Toriumi et al. .
4,033,684  7/1977  Toriumi et al. .
4,134,674  1/1979  Ohsaki et al. .
4,174,890 11/1979  Johnson et al. .................. 353/101 X
4,244,641  1/1981  Hofmann et al. ................ 353/101 X
4,283,136  8/1981  Swift et al. .
4,339,182  7/1982  Ueda et al. .
4,549,797 10/1985  Sawano et al. .

FOREIGN PATENT DOCUMENTS 51-42440  4/1976  Japan .
52-109349  9/1977  Japan .

Primary Examiner—Harry N. Haroian
Attorney, Agent, or Firm—Burns, Doane, Swecker & Mathis

[57] ABSTRACT

A microfilm reader comprises a microfiche moving mechanism for sandwiching a microfiche film between an upper glass plate and a lower glass plate and moving the film in two-dimensional directions, and a projecting optical system for projecting images recorded on the film to a screen. The projecting optical system includes a projecting lens housed in a lens case placed on the upper glass plate of the microfiche moving mechanism. This lens case is raised away from the upper glass plate when the microfiche moving mechanism is in motion. The upper glass plate is raised only when the microfiche moving mechanism is in a home position for inserting and removing the microfiche film to/from a position between the upper and lower glass plates.

12 Claims, 14 Drawing Sheets

Fig. 10

| MICRO FICHE | | | | | | | | | | | | | | |
|---|---|---|---|---|---|---|---|---|---|---|---|---|---|---|
| A1 | A2 | A3 | A4 | A5 | A6 | A7 | A8 | A9 | A10 | A11 | A12 | A13 | A14 |
| B1 | B2 | B3 | B4 | B5 | B6 | B7 | B8 | B9 | B10 | B11 | B12 | B13 | B14 |
| C1 | C2 | C3 | C4 | C5 | C6 | C7 | C8 | C9 | C10 | C11 | C12 | C13 | C14 |
| D1 | D2 | D3 | D4 | D5 | D6 | D7 | D8 | D9 | D10 | D11 | D12 | D13 | D14 |
| E1 | E2 | E3 | E4 | E5 | E6 | E7 | E8 | E9 | E10 | E11 | E12 | E13 | E14 |
| F1 | F2 | F3 | F4 | F5 | F6 | F7 | F8 | F9 | F10 | F11 | F12 | F13 | F14 |
| G1 | G2 | G3 | G4 | G5 | G6 | G7 | G8 | G9 | G10 | G11 | G12 | G13 | G14 |

$P_1$, $P_2$, $P_3$, $P_{14}$, F

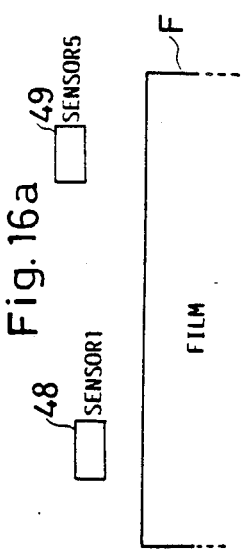
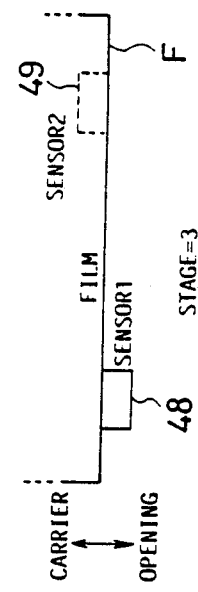
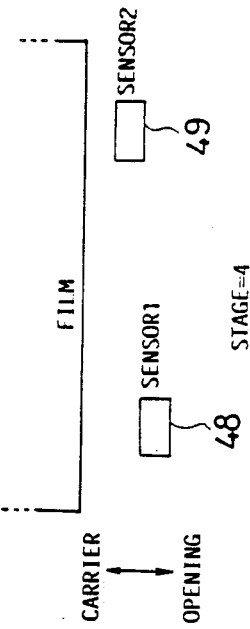
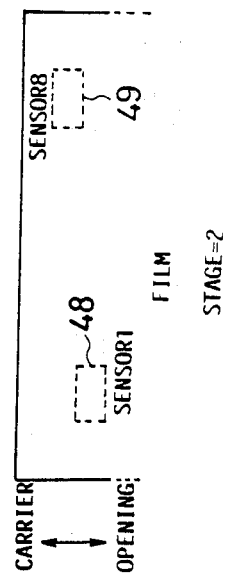

MICROFILM READER FOR MICROFICHE FILMS

BACKGROUND OF THE INVENTION

(1) Field of the Invention

The present invention relates to microfilm readers for microfiche films used as information retrieving apparatus.

(2) Description of Related Art

Microfilm readers for microfiche films such as microfilm reader-printers are widely used as apparatus for retrieving information by projecting images recorded on microfiche films onto a screen.

One such microfilm reader comprises a microfiche supporting device (which is hereinafter referred to in the Description of Related Art as a microfiche moving mechanism) for sandwiching the microfiche film in sheet form between an upper glass plate and a lower glass plate and moving the microfiche film longitudinally and transversely, and a projecting optical system for projecting images recorded on the microfiche film onto the screen. As shown in FIG. 1, a principal portion of the projecting optical system includes an exposure lamp 211, a condenser lens 212 and a reflecting mirror 213 arranged below the microfiche moving mechanism having lower glass plate 201 and upper glass plate 202 as main components thereof for sandwiching microfiche film F. The above three optical elements constitute a light-source side of the system for illuminating the microfiche film F. On the side upward of the microfiche moving mechanism, the projecting optical system includes a projecting lens 214 housed in a lens case 214a placed on the upper glass plate 202, and an image turning prism 216 housed in a holder 215 to be coaxial with the projecting lens 214. These optical elements project light which has passed through the microfiche film F onto the screen via a projecting mirror 217.

The microfiche film F is searched for a desired image recorded thereon by moving the lower glass plate 201 and upper glass plate 202 together in X-Y directions instead of moving the the projecting optical system. In this case, the upper glass plate 202 and projecting lens 214 are in contact with each other and, therefore, the lower end of the projecting lens 214 slides on the top surface of the upper glass plate 202. Moreover, since the projecting lens 214 and image turning prism 216 are arranged coaxially to form a unit, the lens case 214a, as a whole, has a considerable weight which results in their being a heavy load on the upper glass plate 202.

Where the microfiche moving mechanism for moving the upper and lower glass plates 202 and 201 is automated with a motor or the like, the movement thereof is faster and more frequent than manual movement. However, this gives rise to the problem that the projecting lens 214 tends to make many scratches on the surface of upper glass plate 202.

If, on the other hand, the upper glass plate 202 were formed of hard glass which is scratch-resistant, it would render the manufacturing process difficult and increase the cost.

A proposal has been made to so arrange the projecting lens 214 that it is out of sliding contact with the upper glass plate 202. However, this proposal is hardly practicable since, with the projecting lens spaced from the upper glass plate, a high degree of planar precision is required of the microfiche moving mechanism because a projecting lens providing a high magnification rate is often used for projecting the images recorded on the microfiche film and such a lens has a small depth of focus.

There are also microfilm readers of the autoloading type which automatically transport the microfiche film to and from a position between the upper and lower glass plates of the microfiche moving mechanism. Accordingly, as disclosed in Japanese Patent Publications 53-47006 and 55-25406, the upper glass plate is lifted in timed relationship with movement of the microfiche moving mechanism to the home position for loading and unloading the film.

The known means of lifting the upper glass plate by utilizing the movement of the microfiche moving mechanism as mentioned above has the following disadvantages:

(1) If an attempt is made to lift the upper glass plate with weak strength, the lifting means must have a very long stroke from the point of view of strength. This results in an increase in the size of the microfiche moving mechanism.

(2) Where this lifting means is used in the autoloading type reader, rollers of the loading device fail satisfactorily to engage and discharge the microfiche film if the film becomes curled during an unloading operation.

(3) Since the microfiche moving mechanism moves during a period following insertion of the microfiche film between the upper and lower glass plates of the microfiche moving mechanism until the upper glass plate is fully lowered, mechanism is required for engaging and holding the film during this time against displacement from a correct position. Such a mechanism lends complexity to the construction.

SUMMARY OF THE INVENTION

A primary object of the present invention, therefore, is to provide an improved microfilm reader for microfiche films, which substantially avoids the aforementioned disadvantages.

Another object of the present invention is to provide a microfilm reader wherein a high planar precision is not needed for the upper glass plate and yet there is no possibility of the projecting lens or the upper glass plate being scratched by movements of the microfiche moving mechanism.

A further object of the invention is to provide a microfilm reader of the auto loading type which is capable of smoothly loading and unloading the microfiche film without increasing the size of the microfiche moving mechanism.

The above objects are fulfilled according to the present invention by a microfilm reader comprising film support means for supporting and moving the microfiche film, the film support means including an upper glass plate and a lower glass plate for sandwiching the microfiche film therebetween; projecting means including a light source and a projecting lens for projecting micro-images recorded on the microfiche film sandwiched between the upper glass plate and lower glass plate; and lens support means for positionally setting and supporting the projecting lens, the lens support means being movable between a projecting position to contact the upper glass plate and maintain the projecting lens at a predetermined distance to the microfiche film and a retracted position out of contact with the upper glass plate.

Preferably, the microfilm reader further comprises actuator means for moving the lens support means between the projecting position and the retracted position, and control means for controlling the drive means to move the lens support means into the retracted position when the film support means is actuated.

In a preferred embodiment of the invention, the microfilm reader further comprises, in addition to the actuator means, drive means for moving the film support means, input means for inputting an amount of movement of the film support means, and control means operable in response to the input means to control the drive means and also to control the actuator means for moving the lens support means to the retracted position.

The input means may include key input means having a plurality of keys for inputting coordinates of the micro-images.

According another aspect of the present invention, a microfilm reader comprises film support means for supporting and moving the microfiche film, the film support means including an upper glass plate and a lower glass plate, the upper glass plate being pivotable upwardly for receiving and sandwiching the microfiche film between the upper and lower glass plates; projecting means including a light source and a projecting lens for projecting micro-images recorded on the microfiche film sandwiched between the upper glass plate and lower glass plate; lens support means for supporting the projecting lens, the lens support means being movable between a projecting position to contact the upper glass plate and maintain the projecting lens at a predetermined distance to the microfiche film and a retracted position out of contact with the upper glass plate; glass lifting means for lifting the upper glass of the film support means; and film transport means for transporting the microfiche film inserted from outside, the film transport means being operable to drive the glass lifting means only when the film support means is in a position for receiving and releasing the microfiche film.

The glass lifting means may be affixed to the film transport means. The film transport means may be disposed adjacent an outer edge of a range of movement of the film support means.

In the microfilm reader according to this invention, the projecting lens is advantageously housed in the lens case which is movable upwardly and away from the upper glass plate by a lens lifting mechanism when the microfiche film support means is in motion. This construction eliminates the possibility of the lens case forming scratches on the upper glass plate, thereby preventing any trouble or cost involved in replacing the upper glass plate. The upper glass plate is free from scratches even if it is formed of glass having a low degree of hardness, and this feature contributes towards low cost. Furthermore, since the lens case is set to a correct position through contact with the upper glass plate at image projecting times, a very high degree of planar precision is not required of the microfiche moving mechanism.

Moreover, according to a preferred feature, the upper glass plate is not lifted unless the film support means is in the home position. This feature dispenses with the requirement for a mechanism for associating the lifting of the upper glass plate with the movement of the film support means, thereby allowing the film support means to be compact.

Since the upper glass plate is lifted only when the film support means reaches the home position, the microfiche film, even if it becomes curled at that time, is engaged relatively smoothly by rollers of the loading mechanism. Thus, there is little possibility of trouble occurring with the film discharge.

The film support means remains stationary during the period following insertion of the microfiche film between the upper and lower glass plates until the upper glass plate is fully lowered. Consequently, the microfiche film is held in a correct position without necessitating a complicated mechanism for preventing any inadvertent movement of the film between the upper and lower glass plates.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 10 is a plan view of a entire microfiche film.

DESCRIPTION OF THE PREFERRED EMBODIMENTS

Figure 1:
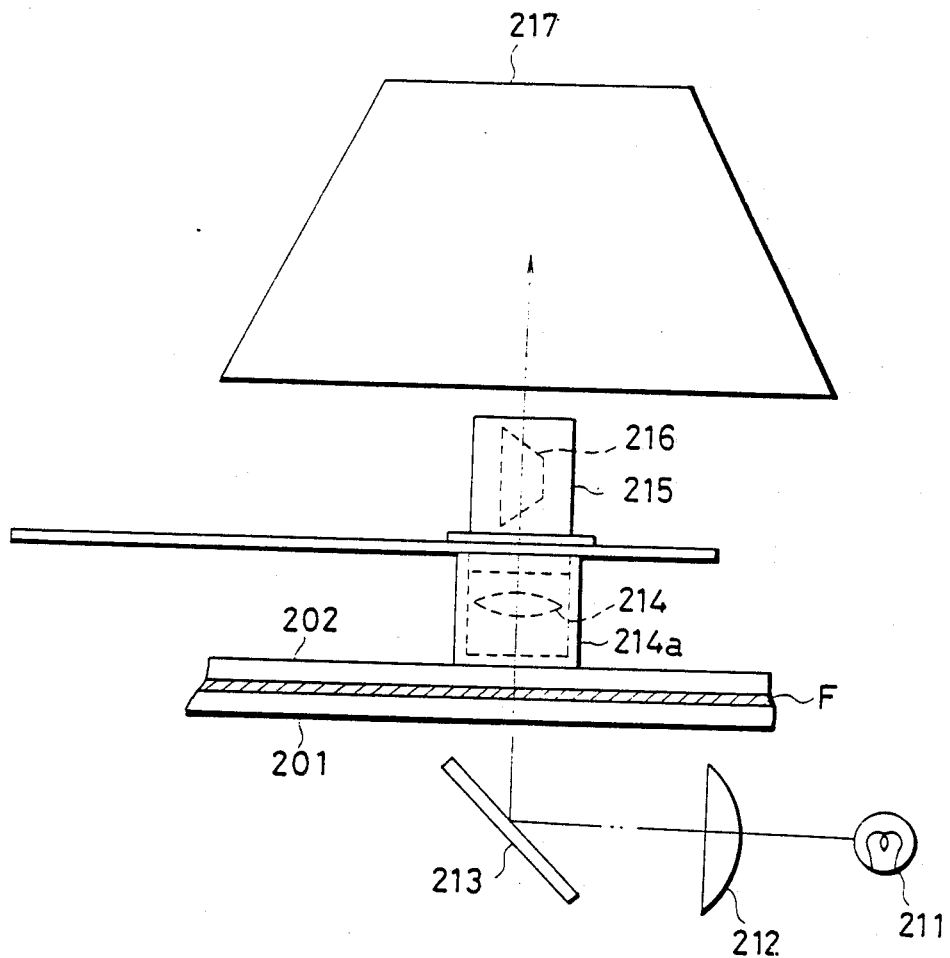
FIG. 1 is a view illustrating a projecting optical system of a conventional microfiche reading apparatus.
Figure 2:
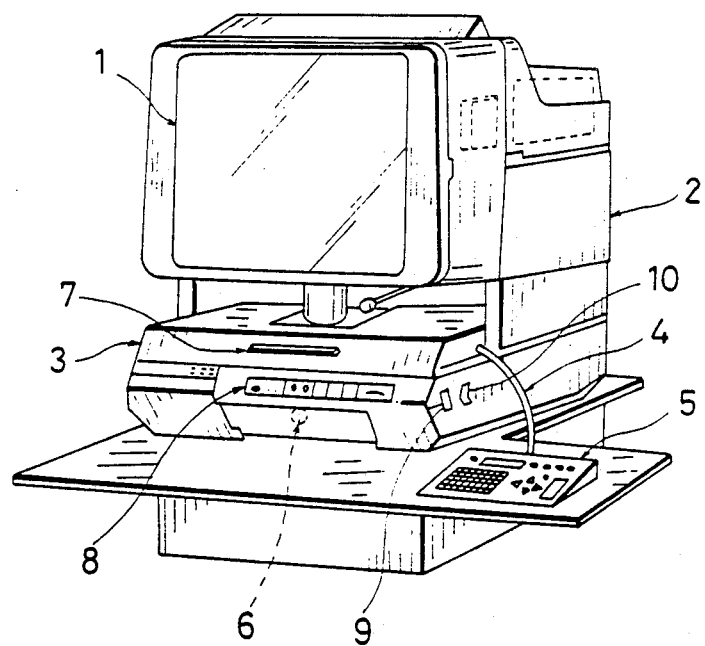
FIG. 2 is an overall perspective view of a reader-printer which is one example of a microfiche reading apparatus constructed in accordance with the present invention.

Referring to FIG. 2 of the drawings, the reader-printer for searching a microfiche film F carrying a multiplicity of images comprises a main body 2 having a screen 1 centrally thereof, a microfiche moving mechanism 3 for moving the microfiche film F longitudinally and transversely, and a controller 5 connected to the microfiche moving mechanism 3 through a cable 4. FIG. 10 shows an example of microfiche film F applicable to this reader-printer, which includes a multiplicity of micro-images in frames P1, P2 ... recorded in matrix form. The frames P1, P2 are identified by designating rows (i.e. Y-axis addresses A, B ... ) and columns (X-axis addresses 1, 2 ...). While the illustrated example includes 7 rows of Y-axis addresses A-G and 14 columns of X-axis addresses 1–14, the microfiche film generally is in various formats and the most popular film has 15 rows on Y-axis and 18 columns on X-axis.

Reverting to FIG. 2, the reader-printer includes a projecting optical system having an image turning function. The image turning function here signifies the function to turn about an optical axis a prism disposed on a micro-image projecting optical path thereby to turn the projected micro-image about the optical axis. The reader-printer further includes an insert opening 7 for inserting the microfiche film F, a control panel 8 for selecting a format of the microfiche film F, for positive/negative switching and so on, an image turn switch 9 for turning the image projected on the screen 1 as necessary by means of the above image turning function, and a power switch 10.

Figure 3:
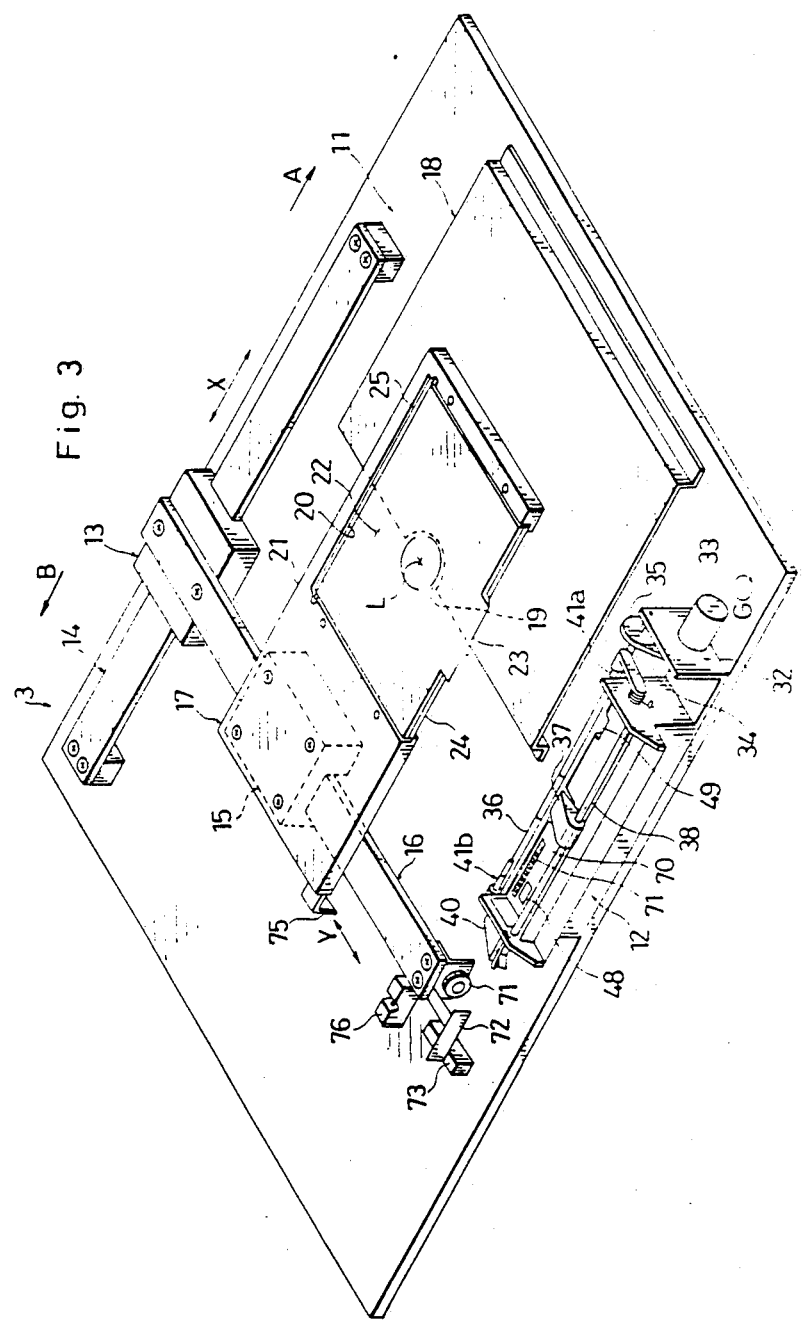
FIG. 3 is a perspective view of a microfiche moving mechanism.

Referring to FIG. 3, the microfiche moving mechanism 3 comprises an X-Y carrier section 11 and a loading block 12.

Specifically, the X-Y carrier section 11 includes a first movable deck 13, a first linear pulse motor 14 for transporting the first movable deck 13 in directions of arrow X, a second movable deck 15, a second linear pulse motor 16 having an end thereof fixed to the first movable deck 13 for transporting the second movable deck 15 in directions of arrow Y, a main X-Y carrier body 17 having an end thereof fixed to the second movable deck 15, and a slide plate 18 having a Teflon-coated top surface and supporting the other end of the main X-Y carrier body. The slide plate 18 defines a semicircular cutout 19 for image projection, having a center on a projecting optical axis L.

The second linear pulse motor 16 includes at the other end thereof a roller 71 rotatable in the X directions and an X-axis interrupter 72 projecting from the other end and having an appropriate area. An X-axis photo-interrupter 73 is disposed at a position to detect a righthand end of the X-axis interrupter 72 when the main X-Y carrier body 17 is in a position opposed to the loading block 12 for loading and unloading the microfiche film to/from the loading block 12 (hereinafter referred to as home position) or when the main X-Y carrier body 17 is in any position corresponding to the home position with respect to X-axis (i.e. in the X direction).

The main X-Y carrier body 17 carries a Y-axis interrupter 75 adjacent its lower lefthand corner. And a Y-axis photo-interrupter 76 is disposed at a position to detect the Y-axis interrupter 75 when the main X-Y carrier body 17 is in the home position.

The main X-Y carrier body 17 includes a carrier case 21 having an approximately U-shaped configuration in plan view defining a recess 20, and a film retainer 22 mounted in the recess 20 for sandwiching the microfiche film F. The carrier case 21 has a Teflon-coated bottom surface for facility of its sliding movement on the slide plate 18.

Figure 4:
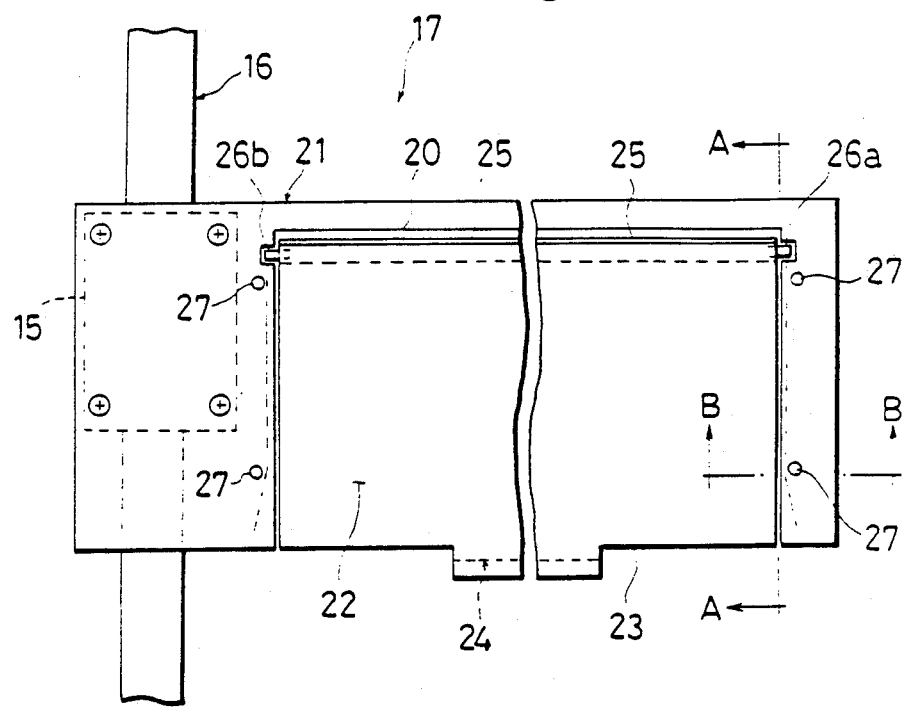
FIG. 4 is a plan view of a main X-Y carrier body.
Figure 5:
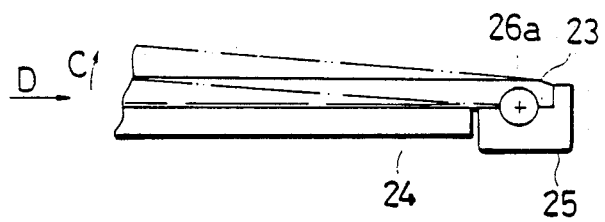
FIG. 5 is a section taken on line A—A of FIG. 4.
Figure 6:
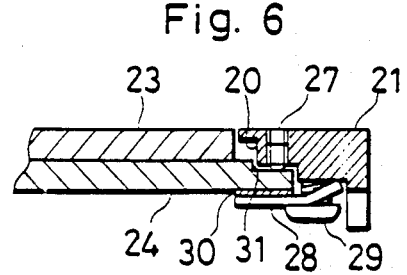
FIG. 6 is a section taken on line B—B of FIG. 4.

As shown in FIGS. 4 and 5, the film retainer 22 includes, as main components thereof, an upper glass plate 23, a lower glass plate 24, and a support member 25 secured to the upper glass plate 23. The support member 25 has a right and left pair of projecting pins 26a and 26b, and by means of these pins 26a and 26b the upper glass plate 23 rests on the carrier case 21. As also shown in FIG. 6, the carrier case 21 includes four height setting screws 27 disposed adjacent the recess 20 and adjacent four corners of the lower glass plate 24, and four support plates 28 comprising elastically deformable elements like leaf springs and opposed to the height setting screws 27, respectively. The lower glass plate 24 is held between the height setting screws 27 and the support plate 28, with the support plates 28 supporting the lower glass plate 24 at both lateral sides. Number 29 indicates a clamp for attaching each support plate 28 to the carrier case 21. The clamp 29 presses and fixes the lower glass plate 24 through the support plate 28 to the height setting screw 27. Number 30 indicates a sponge packing interposed between the lower glass plate 24 and support plate 28 to maintain them in spaced relationship. The height of upper glass plate 23 placed on the lower glass plate 24 is adjustable by adjusting the screwing depth of the screws 27, whereby the top surfaces of upper glass plate 23 and carrier case 21 are made flush. Since the screws 27 are disposed adjacent the four corners of the lower glass plate 24, the upper glass plate 23 and carrier case 21 may be made flush at all mutually close locations. The lower glass plate 24 defines stepped portions 31 which prevent the microfiche film F sandwiched between the upper glass plate 23 and lower glass plate 24 from becoming caught between the lower glass plate 24 and carrier case 21.

According to the main X-Y carrier body 17 as constructed above, the upper glass plate 23 is pivoted as shown in phantom lines in FIG. 5 in the direction of arrow C to permit entry of microfiche film F in the direction of arrow D. The support member 25 limits the movement of a leading end of microfiche film F whereby the film F stops at a correct position. Further, the top surfaces of film retainer 22 and carrier case 21 are flush with each other and the film F is placed without any inclination relative to the projecting optical axis L. All these aspects allow an image to be projected tot he screen 1 with high precision. The stepped portions 31 of the lower glass plate 24 are effective to prevent the microfiche film F from becoming caught between the lower glass plate 24 and carrier case 21. Consequently, information retrieval is conveniently carrier out without any trouble in insertion and removal of the microfiche film F.

Figure 7:
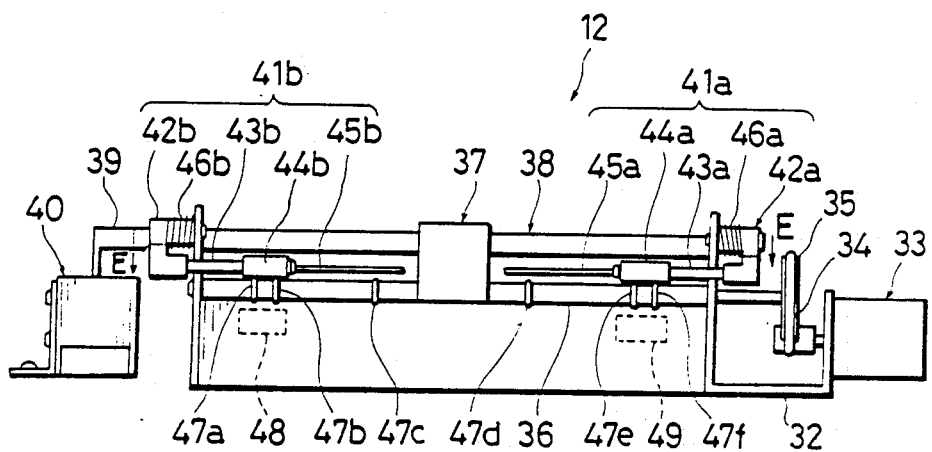
FIG. 7 is a view of a loading block as seen from the main X-Y carrier body.

The loading block 12 is provided for loading the film on an unloading it from the main X-Y carrier body 17 in home position. Referring to FIG. 7, the loading block 12 comprises a base 32, a loading motor 33 attached to the base 32, a drive shaft 36 operatively connected to the loading motor 33 through a belt 34 and a pulley 35, a lifting lever 37 for lifting the upper glass plate 23, a lifting lever shaft 38 fixedly carrying the lifting lever 37, and a solenoid 40 operatively connected to the lifting lever shaft 38 through a lifting lever arm 39. Numbers 41a and 41b indicate a right and left pair of guide roller assemblies each including an arm 42a or 42b having a proximal end thereof attached to the base 32, a guide roller 43a or 43b fitted in a distal end of the arm 42a or 42b, a plastic ring 44a or 44b covering a distal end region of the roller 43a or 43b, and a guide member 45a or 45b attached to a distal end of the roller 43a and 43b. Numbers 46a and 46b indicate coil springs for biasing the arms 42a and 42b in the direction of arrow E, respectively. Numbers 47a–47f indicates O-rings mounted on the drive shaft 36 for protecting the microfiche film F from damage.

The loading block 12 further comprises first loading sensor 48 and a second loading sensor 49 for detecting the microfiche film F being inserted. When the film F is loaded into a retrieval apparatus such as a reader-printer, the film F is not always inserted into the insert opening 7 (FIG. 2) from a direction perpendicular thereto but is inserted at an angle at times. In view of this practice, the embodiment under discussion includes the loading sensors 48 and 49 at opposite lateral positions of the loading block 12, which are operatively connected to the loading motor 33, respectively. The loading motor 33 continues operating until the leading end of microfiche film F comes into contact with the support member 25 of the film retainer 22 (FIG. 5). Consequently, the loading motor 33 remains in operation when one of the right and left corners at the leading end of microfiche film F is not in contact with the support member 25 through the other corner is. This assures the microfiche film F stopping with both right and left corners at the leading end thereof contacting the support member 25 instead of stopping at a slant position.

The reader-printer according to the present embodiment has the microfiche moving mechanism 3 as described above. How this mechanism 3 operates will now be described with reference to FIG. 3.

First, the controller 5 is operated to move the main X-Y carrier body 17 to the home position for receiving the microfiche film F and to engage a distal end of lifting lever 37 with the upper glass plate 23. Whether the main X-Y carrier body 17 is in the home position or not is checked by means of the X-axis photo-interrupter 73 and Y-axis photo-interrupter 76. Next, the solenoid 40 is electrified for actuating the lifting lever 37 to lift the upper glass plate 23. When the microfiche film F is inserted into the insert opening 7 (FIG. 2), the first loading sensor 48 and then the second loading sensor 49 of the loading block 12 detect the microfiche film F and simultaneously the loading motor 33 starts rotating in the direction of arrow G to feed the film F. The film F advances through a space between the guide rollers 41a, 41b and drive shaft 36 under the conveying force of drive shaft 36 and is guided in a proper direction by guide rollers 41a, 41b. Ultimately the microfiche film F rests in the position between the upper glass plate 23 and lower glass plate 24 of the main X-Y carrier body 17. When the microfiche film F contacts the support member 25, the solenoid 40 is de-electrified to lower the lifting lever 37. As a result, the upper glass plate 23 is lowered to sandwich the microfiche film F with the lower glass plate 24. After lapse of a fixed time the second linear pulse motor 16 is driven to move the main X-Y carrier body 17 in the direction of arrow Y away from the loading block 12, and then the loading motor 33 is stopped. Thereafter the controller 5 is operated to carry out a desired information retrieving operation.

For removing the microfiche film F from the microfiche moving mechanism 3, the controller is similarly operated to move the main X-Y carrier body 17 to the home position. When the main X-Y carrier body 17 is in the home position, the solenoid 40 is electrified for actuating the lifting lever 37 to lift the upper glass plate 23. Then the loading motor 33 is driven to remove the microfiche film F from the microfiche moving mechanism 3. The removal of film F is readily confirmed by means of the first and second loading sensors 43 and 44. Finally, upon lapse of a fixed time, the loading motor 33 is stopped to complete the whole operation.

Figure 8:
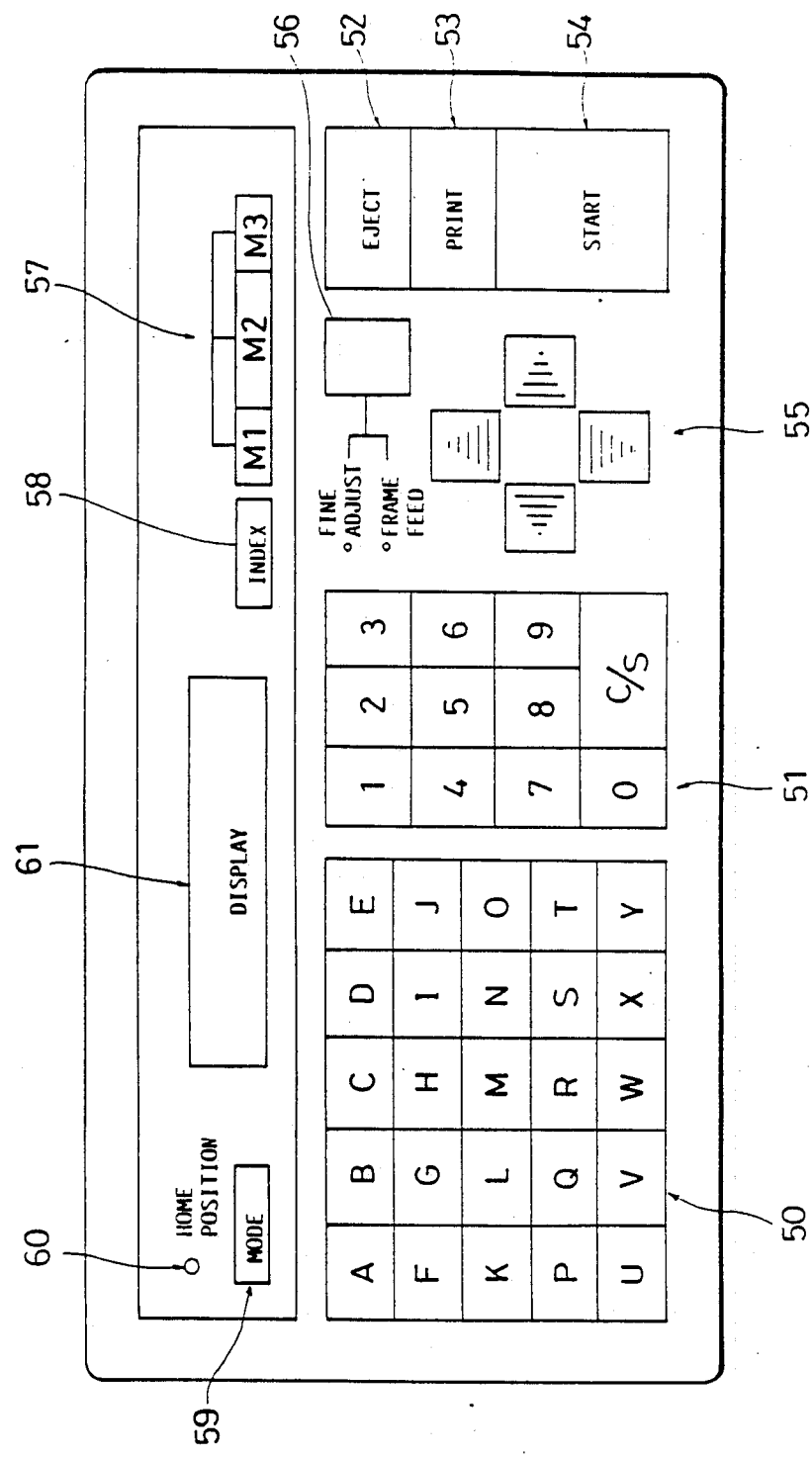
FIG. 8 is a plan view of a controller, .

FIG. 8 illustrates one example of controller 5. Number 50 in the drawing indicates Y-axis address keys for designating Y-axis addresses of microfiche film F. Number 51 indicates X-axis address keys for designating X-axis addresses of film F. Number 52 indicates an eject key for driving the first and second linear pulse motors 14 and 16 to move the main X-Y carrier body 17 to the home position for the microfiche film F to be removed from the film moving mechanism 3. Number 53 indicates a print key for instructing a copying operation. Number 54 indicates a start key for starting a searching operation. Number 55 indicates fine adjustment/frame feed keys. Number 56 indicates a select key for selecting between a fine adjustment mode and a frame feed mode to the effected through the keys 55. Number 57 indicates memory keys for storing input addresses and carrying out various memory operations. Number 58 indicates an index key for selectively designating the indices recorded on the microfiche film F. Number 59 indicates a mode select key for selectively designating modes registered on the format of film F. Number 60 indicates an indicator lamp comprising, for example, a light emitting diode for indicating that the main X-Y carrier body 17 is in the home position for receiving the film F. Number 61 indicates an indicator section for indicating designations made by the Y-axis address keys 50, X-axis address keys 51, index key 58 and mode select key 59.

Figure 9:
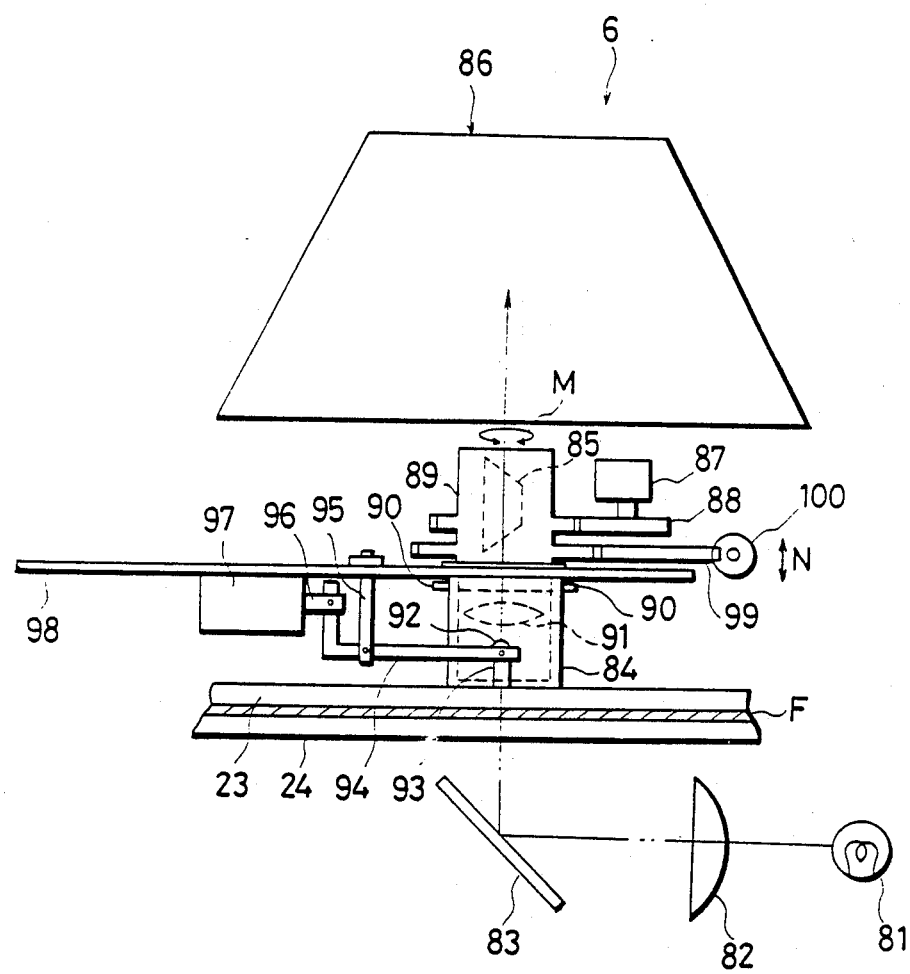
FIG. 9 is a schematic view showing an outline of a projecting optical system.

FIG. 9 schematically shows the projecting optical system 6. As seen, this optical system includes a light source 81 such as an exposure lamp, a condenser lens 82, and a projecting lens 91 housed in a lens case 84. This lens case 84 defines an elongate cutout 93 in a lower position thereof extending parallel to the optical axis, and carries stopper pins 90 at two upper positions thereof for preventing the lens case 84 from being lifted to excess. These provisions allow the lens case 84 to move vertically within a fixed range. The cutout 93 receives a lift pin 92 attached to a distal end of a lever 94 pivotally connected at an intermediate position thereof to a support 95 fixed to a base 98. When the lift pin 92 is moved upward, it lifts the lens case 84 by engagement with the cutout 93. The lever 94 is connected at the other end to a plunger 96 of a solenoid 97 fixed to the base 98. A pulling action of the solenoid 97 causes the lens case 84 to be lifted. The solenoid 97 is operable in response to operations of the start key 54 and fine adjust/frame feed key 55.

Number 85 indicates the image turning prism which has a trapezoidal shape and includes a lens. The prism 85 is contained in holder 89 spaced slightly upwardly from the lens case 84, and is connected to a pulse motor 87 through a gear 88. When an image is recorded sideways or inverted on the microfiche film F, the image turn switch 9 is operated to rotate the image turning prism 85 in directions of arrow M for projecting the image as erected on the screen 1. Number 100 indicates a focusing dial connected to the holder 89 through a helical gear 99. Thus, the holder 89 is movable in directions of arrow N by turning the focusing dial 100 whereby the image is readily brought into focus.

With the projecting optical system 6 as constructed above, when the microfiche film F is placed between the upper and lower glass plates 23 and 24 and the start switch 54 (FIG. 8) is operated to produce a retrieval start command, light from the light source 81 travels through the condenser lens 82, and is reflected by the reflecting mirror 83 to illuminate the microfiche film F. The light having passed the microfiche film F travels through the projecting lens 84 and image turning prism 85 to a projecting mirror 86. The light is directed by the projecting mirror 86 to the screen 1 to project an image centrally thereof.

As described above, the lens case 84 containing the projecting lens 91 is movable away from the upper glass plate 23 in response to operation of the start key 54, etc. for starting an information retrieval. This allows the upper glass plate 23 to move while the top face thereof is maintained out of contact with the projecting lens 91 and lens case 84. As a result, the top face of upper glass plate 23 is free from damage, thereby obviating the trouble and cost of changing the upper glass plate 23. It also provides an advantage of low manufacturing cost in that the upper glass plate 23 need not be formed of a hard material. Further, the moving mechanism is not required to have a very high degree of precision in moving the microfiche film on a horizontal plane since the lens case 84 is set in position contacting the upper glass plate 23 at times of image projection.

The retrieval operation may be carried out efficiently where the solenoid 87 and lever 94 acting as lens lifting mechanism are operable in association with the automatic retrieval mechanism as described. This lens lifting mechanism of course is adaptable to a manual retrieval operation as we 1 by providing an actuating switch therefor.

Where such an actuating switch is provided on the controller 5, the projecting lens 91 may be lifted not only when the microfiche moving mechanism 3 is in operation but for facility of cleaning the glass plates, dealing with a jam in film loading, and other such operations.

Figure 11:
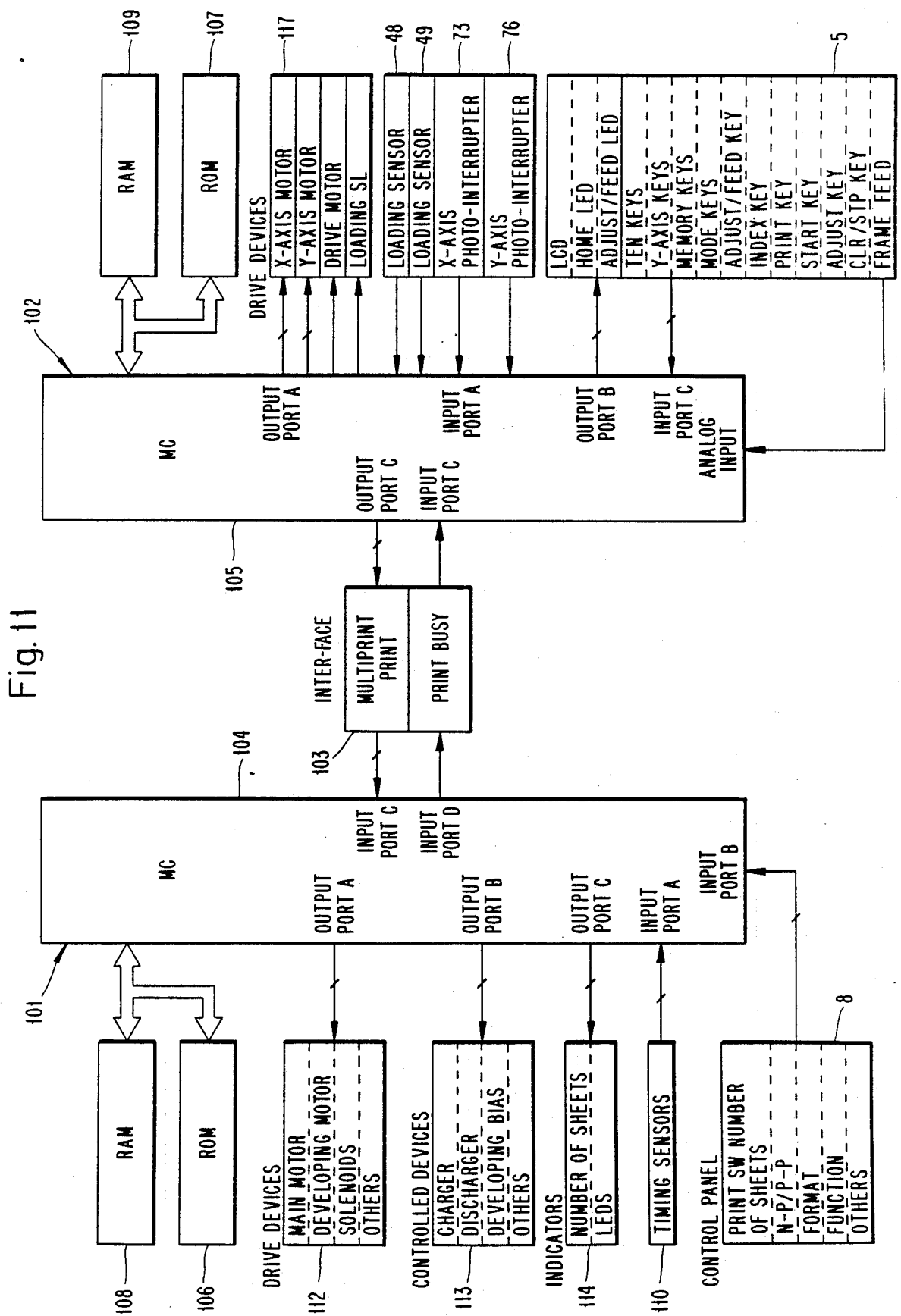
FIG. 11 is a block diagram of a control system of the reader-printer.

FIG. 11 shows a system for controlling the described reader-printer. This system comprises two blocks, i.e. a control block 101 for controlling the main body 2 of the reader-printer and a control block 102 for controlling the microfiche moving mechanism 3. The two control blocks 101 and 102 are interconnected by an interface 103. Each of the control blocks 101 and 102 includes a microcomputer 104 or 105, a ROM 106 or 107, and a RAM 108 or 109. The microcomputer 104 has input ports for receiving signals from various timing sensors 110 and signals from the control panel 8 including a print switch, a number of pages key, an N-P/P-N changeover key, and other control keys, and output ports for supplying signals to a group of drive devices 112 including a main motor, a developing motor, solenoids and so on, to a group of controlled devices including a charger, a discharger, a developing bias and so on, and to indicating devices 114 such as a number of pages indicator and various light emitting diodes. The microcomputer 105 has input ports for receiving signals from a group of sensors 115 including the loading sensors 48 and 49, X-axis and Y-axis photo-interrupter 73 and 76, and so on, and signals from the ten keys, Y-axis keys, memory keys, mode key, print key, start keY and other keys of the controller 5, and output ports for supplying control signals to a group of drive devices 117 including the linear pulse motors 14 and 16, loading motor 33, solenoid 40 and so on, and to the indicators on the controller 5 such as the fine adjustment/frame feed diode, home position diode, and indicating section 61. The interface 103 intercommunicating the two control blocks 101 and 102 communicates control signals from one block to the other at times of retrieval in a read mode, and retrieval and printing in a print mode. At a time of so-called multiprinting when a plurality of pages recorded on the microfiche film F are printed, for example, a signal designating a multi-print mode and a print signal are communicated from the control block 102 for the microfiche moving mechanism 3 to the control block 101 for the main body 2, and a print busy signal is communicated in the counter direction from the control block 101 to control block 102. The print busy signal is a signal for prohibiting the microfiche moving mechanism 3 from inadvertently moving upon input of a different signal during a printing operation.

Figure 12:
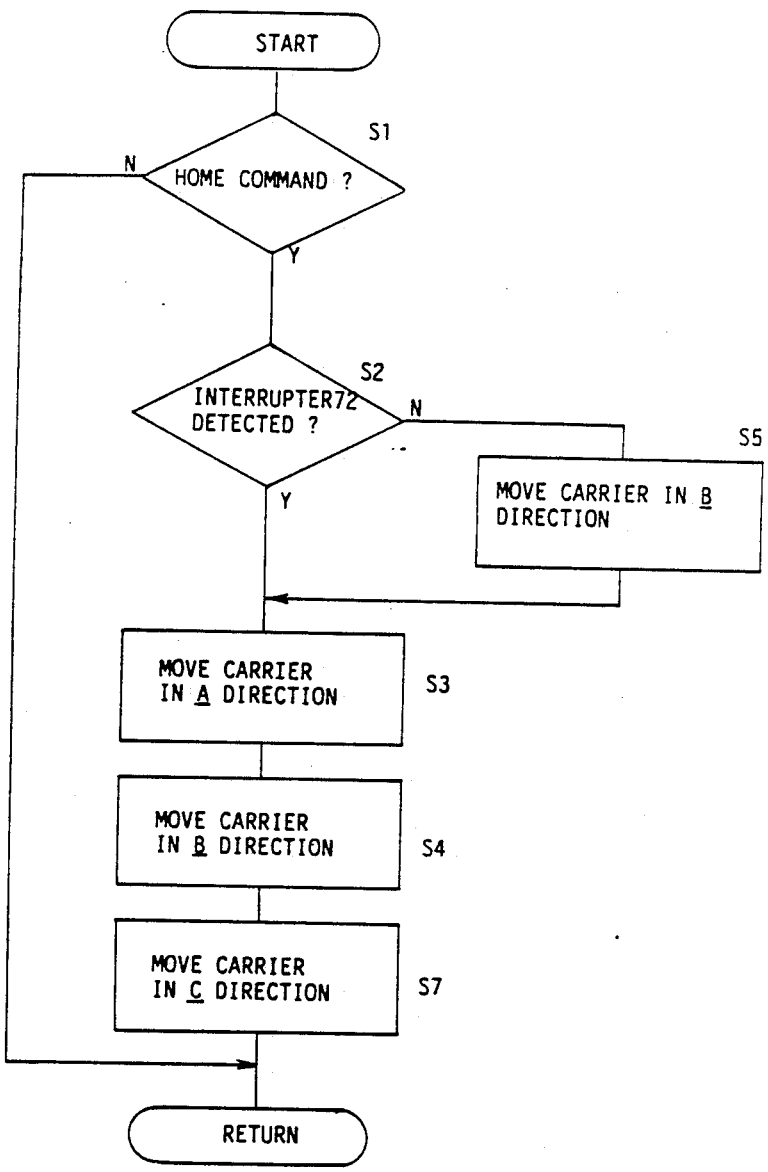
FIG. 12 is a flow chart illustrating an operation for moving the main X-Y carrier body to home position.

FIG. 12 shows a subroutine executed by the microcomputer 105 to move the main X-Y carrier body 17 to the home position for loading and unloading the microfiche film F. When a home return command is given at step S1 by pressing the eject key 52 of the controller 5, step S2 checks whether the X-axis photointerrupter 73 detects the interrupter 72 or not. If it does, the program proceeds to step S3 at which the main X-Y carrier body 17 is moved rightward (hereinafter called A direction) ar high speed until the X-axis photo-interrupter 73 ceases detecting the interrupter 72. Then, at step S4, the main X-Y carrier body 17 is moved leftward (hereinafter called B direction) at low speed, and stopped upon detection of the interrupter 72. If the X-axis photointerrupter 73 does not detect the interrupter 72 at step S2, the program proceeds to step S5 for moving the main X-Y carrier body 17 in the B direction at high speed until the interrupter 72 is detected, and thereafter executes steps S3 and S4. As a result of the above steps, the main X-Y carrier body 17 stands still with the X-axis photo-interrupter 73 detecting a lefthand edge of interrupter 72. Thus, by positionally adjusting the lefthand edge of interrupter 72, the main X-Y carrier body 17 may be brought accurately to the home position with respect to X-axis. The main X-Y carrier body 17 is moved at high speed and then at low speed in order to place the main X-Y carrier body 17 at the home position promptly. The purpose of moving the main X-Y carrier body 17 in the B direction at low speed and completing a return to the home position upon detection of the interrupter 72 by the X-axis photo-interrupter 73, is to avoid positional variations due to the difference in the direction in which the photo-interrupter 73 is cut.

Figure 13:
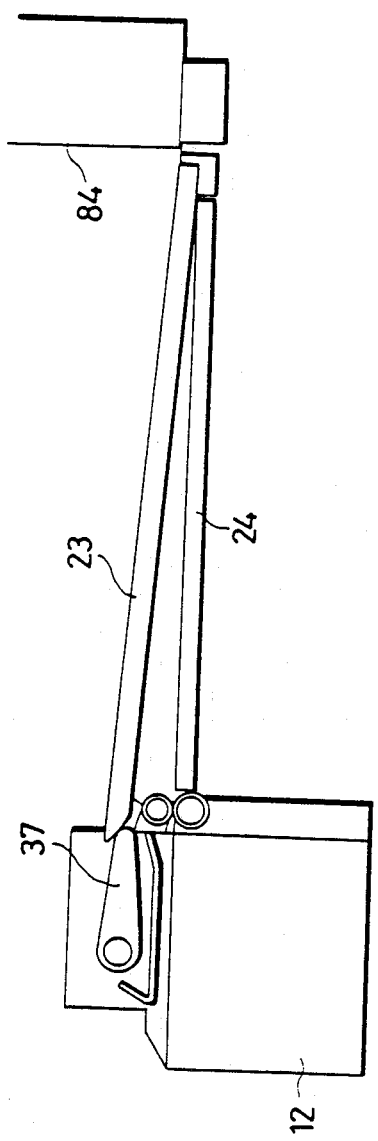
FIG. 13 is a side view of the main X-Y carrier in home position.

After the above steps, the program proceeds to step S7 for moving the main X-Y carrier body 17 at high speed toward the home position with respect to Y-axis. The main X-Y carrier body 17 is stopped when the Y-axis photo-interrupter 76 detects the interrupter 76. This completes a return to the home position of main X-Y carrier body 17 with respect to both X-axis and Y-axis. In the home position, the upper glass plate 23 is in engagement with a distal end of the lever 37 as shown in FIG. 13. Consequently, the upper glass plate 23 is raised by turning on the solenoid 40 to turn the lever 37, for loading and unloading the film.

Figure 14:
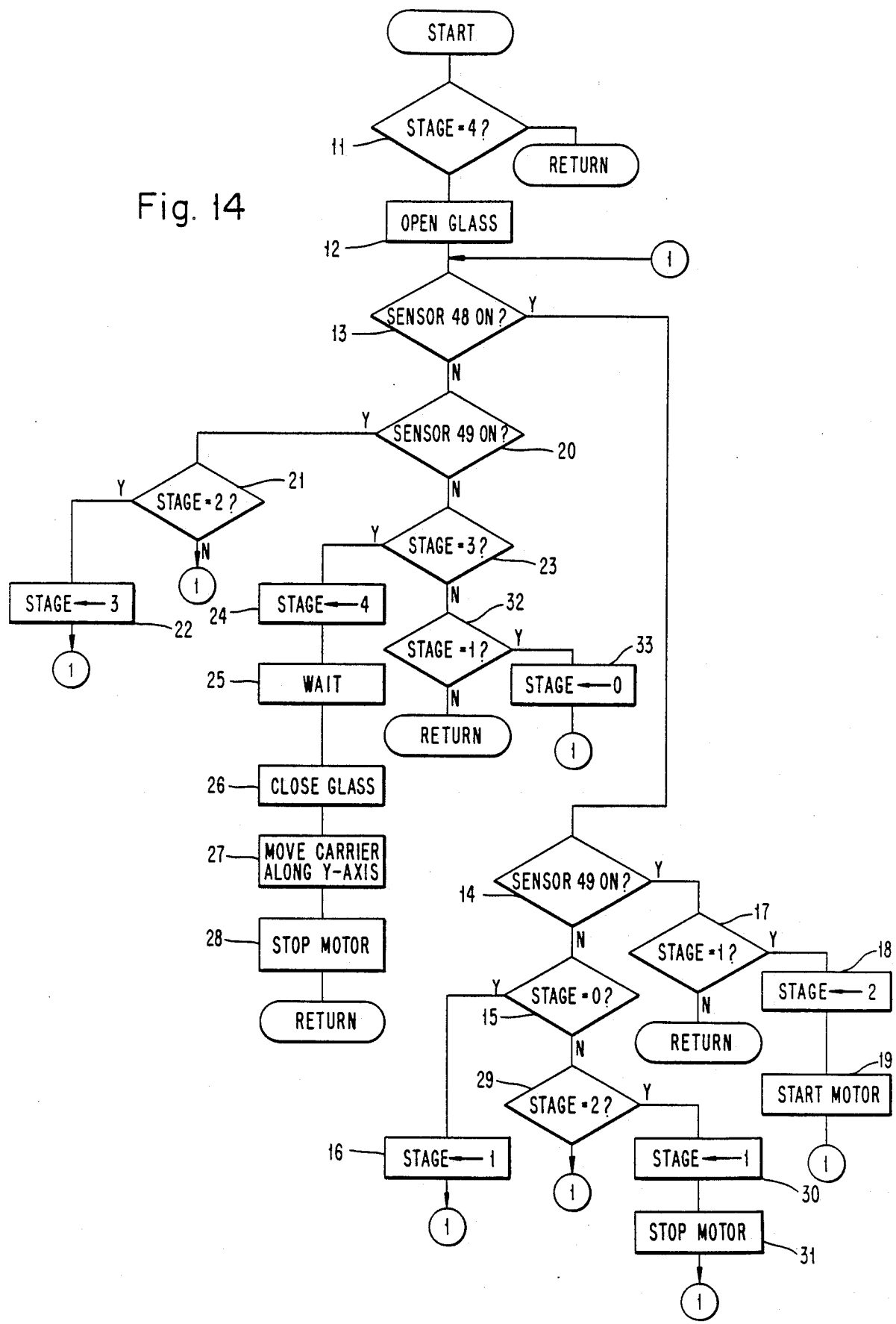
FIG. 14 is a flow chart of a microfiche loading subroutine.

FIG. 14 shows a subroutine executed by the microcomputer 105 for loading the microfiche film. First, step S11 confirms a position or stage of movement of the microfiche film. The stage of the film is determined by detections made by the two loading sensors 48 and 49 included in the loading block. There are five stages as depicted in FIGS. 16 (a) through (e). At stage "0" is before loading of the film F and neither of the loading sensors 48 and 49 detects the film F. At stage "1" the film F is in progress and detected by one of the loading sensors 48. At stage "2" the film F has advanced further and is detected by both of the loading sensors 48 and 49. At stage "3" the film F has advanced still further and is no longer detected by one of the sensors 48. At stage "4" the loading of film F is nearly completed and neither sensor 48 or 49 detects the film F. These stages are judged by referring to a register in the CPU. It is assumed here that the main X-Y carrier body 17 is not loaded with a film and the register shows "0". An operation for loading the main X-Y carrier body 17 with a film will now be described with reference to FIG. 14. If step S11 judges the stage to be other than "4", the program moves to step S12 for turning on the solenoid 40 to actuate the lifting lever 37 and raise the upper glass plate 23. At steps S13 et seq. judgment is made whether the film F is detected by the loading sensors 48 and 49. When the operator manually inserts the film F through the opening 7, one of the sensors 48 and then the other sensor 49 turn on as the film F moves forward past the opening 7. If only one of the sensors 48 turns on, the program moves from step S13 to steps S14 and S15. Step S15 checks whether the stage entered in the register of the CPU is "0" or not. If it is "0", the program moves to step S16 to change the register to "1", and returns to step S13. When the other loading sensor 49 also turns on, the program moves from steps S13 and S14 to step S17 and checks if the register shows stage "1". Since the stage was changed to "1" at step S16 previously, the program moves on to steps S18 and S19. At step S18 the register is set to "2", and at step S19 the loading motor 23 is started thereby to automatically feed the film F into the main X-Y carrier body 17. Thereafter the program returns to step S13.

When one of the loading sensors 48 no longer detects the advancing film F, the program moves to steps S20 and S21. After step S21 confirms that the register shows "2", step S22 sets the register to "3". As the film F advances further and both sensors 48 and 49 turn off, the program moves from step S13 through step S20 to step S23 for confirming that the register shows stage "3", which is followed by step S24 for setting the register to "4". Step S25 is for waiting for the time necessary for the film F to move completely to the position between the upper and lower glass plates 23 and 24. Then, at step S26, the solenoid 40 is turned off to close the upper glass plate 23. At step S27, the second linear pulse motor 16 is actuated to move the main X-Y carrier body 17 along Y-axis away from the loading block 12. Thereafter the loading motor 33 is stopped at step S28.

If step S15 finds the register showing a value other than "0", the program moves to step S29 for judging if the register shows stage "2". In a normal film inserting operation, the register shows "0" at step S15. However, when the operator pulls out the inserted film F, the program moves from step S15 to step S29. In other words, when the operator pulls the film F inserted to the position detected by both of the loading sensors 48 and 49, i.e. at stage "2", the program moves from step S to step S29. Then the program moves to step S30 to change the register to "1" and to step S31 to stop the loading motor 33. If the film F is pulled out, the program returns to step S13 and executes steps S20, S23, S32 and S33 thereby changing the register to "0".

The foregoing sequence is applicable to the case of the film F being inserted straight. If the film F is inserted at an angle, the two loading sensors 48 are turned on in the opposite order. Thus, the CPU judges that the film F is pulled out, and stops the loading motor 33 to maintain a standby state.

Figure 15:
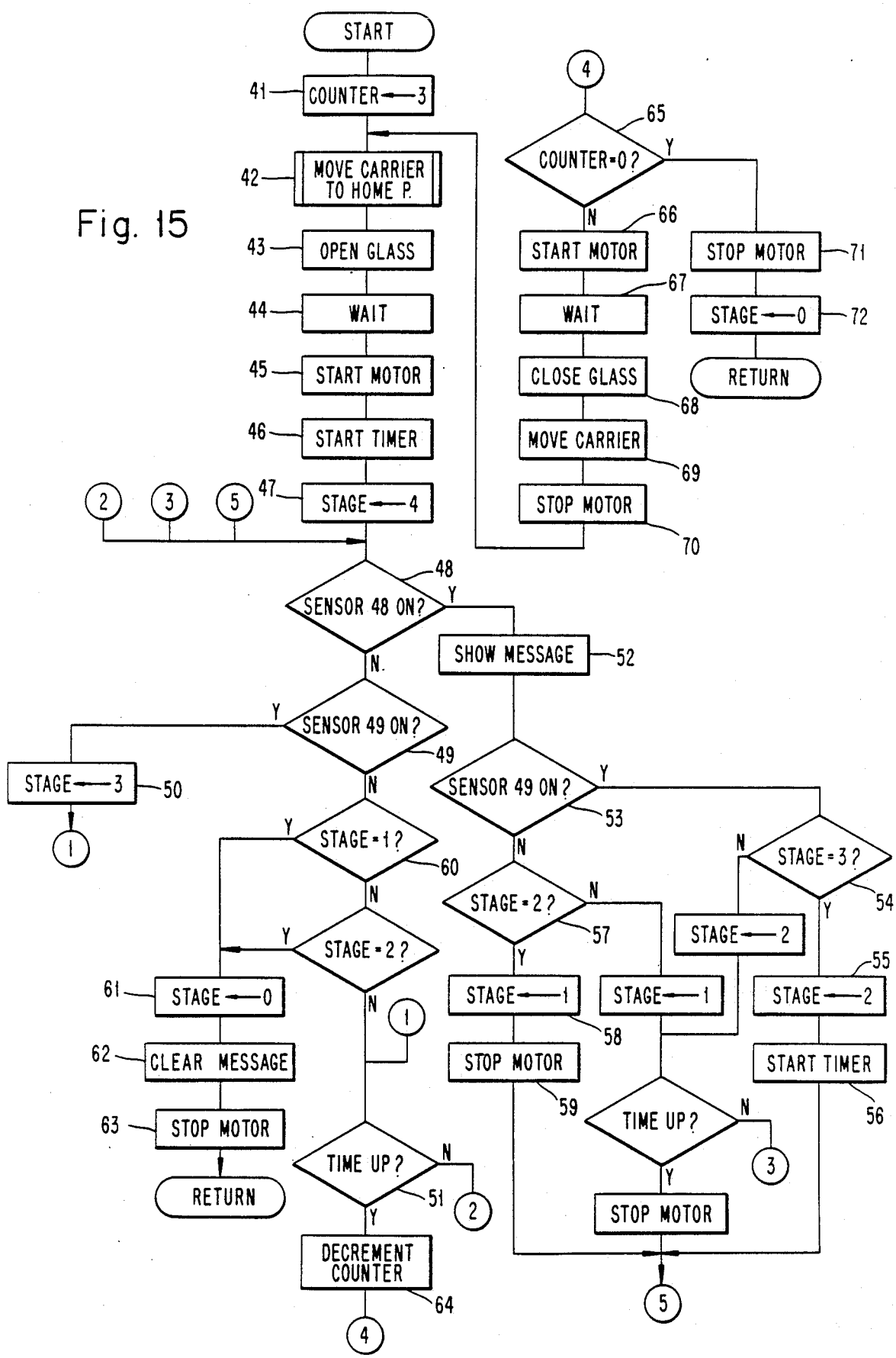
FIG. 15 is a flow chart of a microfiche unloading subroutine, and FIGS. 16 (a) through (e) are schematic views showing various stages of film loading and unloading.

FIG. 15 shows a subroutine executed by the microcomputer 105 for unloading the film F from the main X-Y carrier body 17. When the eject key of the controller 5 is pressed, the main X-Y carrier body 17 is moved to the home position at step S42. This operation has been described in detail with reference to the flowchart of FIG. 12. Prior to this operation, a counter is set to "3" at step S41. This counter is used for repeating the unloading operation when the film F causes a jam. When the main X-Y carrier body 17 returns to the home position, the solenoid 40 is turned on at step S43 for actuating the lifting lever 37 to raise the upper glass plate 23. After waiting at step S44 for the time necessary for the upper glass plate 23 to be raised, the loading motor 33 is driven at step S45 to rotate in a direction to discharge the film F. In parallel with this operation, a jam checking timer is started at step S46 and the register is set to "4" at step S47. When the film F moved by the loading motor 33 to a position detected by one of the loading sensors 49, the program moves to steps S48, S49 and S50 and sets the register to "3". After confirming at step S51 that the foregoing timer does not show an expiration of time, the program returns to step S48. When both loading sensors 48 and 49 turn on with the progress of film discharge, the program moves from step S48 to step S52 to show a "Remove Film" message on the indicator section 61 of the controller 5, and then to steps S53 and S54. Since the register was set to "3" at step S50, the program moves from step S54 to step S55 to change the register to "2". Thereafter step S56 is executed to start a timer. This timer is used to stop the loading motor 33 when the film remains in the opening 7 after lapse of a fixed time. After starting the timer, the program returns to step S48. As the operator pulls the film F out of the insert opening 7, one of the loading sensors 49 turns off first and then the other sensor 48 turns off. When one of the sensors 49 turns off, the program proceeds from step S48 to steps S52, S53, S57, S58, S59 and back to step S48 thereby setting the register to "1" and stopping the loading motor 33. When the other sensor 48 turns off next, the program proceeds from step S48 to steps S49, S60, S61 S62 and S63 thereby setting the register to "0" and eliminating the film remove message. This completes the film unloading operation. This operation is completed even when the film is pulled out at an angle to turn off the loading sensors 48 and 49 in the opposite order.

When the loading sensors 48 and 49 do not detect the film F even after lapse of the fixed time from start of the rotation of the motor 33 in the direction to discharge the film F, the program judges that a film jam has happened. Then the program moves from step S51 to steps S64 through S70 to repeat the film discharge operation after carrying out an operation to feed the film F to the main X-Y carrier body 17. The film discharge operation may be repeated twice when occasion demands, under control by the counter. After repeating the operation a second time, the program moves from step S65 to steps S71 and S72 and takes a standby state for film loading.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A microfilm reader for reading information from a microfiche film, comprising:
   film support means for supporting the microfiche film, said film supporting means including an upper glass plate and a lower glass plate for sandwiching the microfiche film therebetween;
   projecting means including a light source and a projecting lens for projecting micro-images recorded on the microfiche film sandwiched between said upper glass plate and said lower glass plate;

retrieving means for retrieving desired micro-images recorded on the microfiche film by moving said supporting means and said projecting lens relative to one another;

lens supporting means for positionally setting and supporting said projecting lens, said lens support means being movable between a projecting position where said projecting lens is in contact with said upper glass plate in order to maintain said projecting lens at a predetermined distance to said microfiche film and a retracted position where said projecting lens is out of contact with said upper glass plate; and means for automatically moving said lens supporting means from said projecting position to said retracted position during the retrieving operation of said retrieving means.

2. A microfiche reader as claimed in claim 1, wherein said retrieving means further comprises drive means for moving said film supporting means, input means for specifying said desired micro-image to be retrieved, and control means for controlling said drive means in accordance with the desired micro-image specified by said input means.

3. A microfilm reader as claimed in claim 2, wherein said input means includes key input means having a plurality of keys for inputting coordinates of said desired micro-images.

4. A microfilm reader for reading information from a microfiche film, comprising:

film support means for supporting and moving the microfiche film, said film support means including an upper glass plate and a lower glass plate, the upper glass plate being pivotable upward for receiving and sandwiching the microfiche film between the upper and lower glass plates;

projecting means including a light source and a projecting lens for projecting micro-images recorded on the microfiche film sandwiched between said upper glass plate and lower glass plate;

lens support means for supporting said projecting lens, said lens support means being movable between a projecting position to contact said upper glass plate and maintain said projecting lens at a predetermined distance to said microfiche film and a retracted position out of contact with said upper glass plate;

glass lifting means for lifting said upper glass plate of said film support means; and film transport means for transporting the microfiche film inserted from outside, said film transport means being operable to drive said glass lifting means only when said film support means is in a position for receiving and releasing the microfiche film.

5. A microfilm reader as claimed in claim 4, wherein said glass lifting means is affixed to said film transport means.

6. A microfilm reader as claimed in claim 4, wherein said film transport means is disposed adjacent an outer edge of a range of movement of said film support means.

7. A microfilm reader for reading information from a microfiche film, comprising:

film support means for supporting the microfiche film, said film supporting means including an upper glass plate and a lower glass plate for sandwiching the microfiche film therebetween;

a projecting lens for projecting micro-images on the microfiche film sandwiched between said upper glass plate and said lower glass plate at a projecting position where the projecting lens is in contact with said upper glass plate;

specifying means for specifying micro-images to be retrieved;

retrieving means for retrieving micro-images specified by said specifying means by moving said supporting means and said projecting lens relative to one another; and lifting means for automatically lifting up said projecting lens from the projecting position to a retracted position where the projecting lens is out of contact with said upper glass plate when the retrieving operation of said retrieving means is effected.

8. A microfilm reader as claimed in claim 7, wherein said specifying means includes key input means having a plurality of keys for manually inputting coordinates of said desired micro-images.

9. A microfilm reader for reading information from a microfiche film, comprising:

film supporting means for supporting microfiche film, said film supporting means including an upper glass plate and a lower glass plate, the upper glass plate being pivotable upward for receiving and sandwiching the microfiche film between the upper and lower glass plates;

a projecting lens for projecting micro-images recorded on the microfiche film sandwiched between said upper glass plate and said lower glass plate;

moving means for moving said supporting means on a plane perpendicular to the optical axis of said projecting lens;

loading means for loading the microfiche film into said supporting means upon its positioning at a loading position opposite to said loading means and for ejecting the microfiche film from the supporting means upon its positioning at the loading position;

glass lifting means for lifting said upper glass plate of said film supporting means; and control means for controlling said moving means, said loading means and said glass lifting means so as to move said supporting means to the loading position, lift the upper glass plate after the completion of said movement of the supporting means and thereafter load or eject microfiche film.

10. A microfilm reader as claimed in claim 9, wherein said glass lifting means includes a lever which is mounted on said loading means, said lever engaging with said upper glass plate of said supporting means upon its positioning at said loading position.

11. A microfilm reader for reading information from a microfiche film, comprising:

film supporting means for supporting microfiche film, said film supporting means including an upper glass plate and a lower glass plate, the upper glass plate being pivotable upward for receiving and sandwiching the microfiche film between the upper and lower glass plates;

a projecting lens for projecting micro-images recorded on the microfiche film sandwiched between the upper glass plate and said lower glass plate;

moving means for moving said supporting means on a plane perpendicular to the optical axis of said projecting lens;

loading means for loading the microfiche film into the said supporting means upon its positioning at a loading position opposite to said loading means, said loading means including a film inlet for receiving the microfiche film manually inserted, a glass lifting means for lifting said upper glass plate of said film supporting means upon its positioning at the loading position opposite to said loading means to thereby form a insertion space for microfiche film between said upper glass plate and said lower glass plate, and transporting means for transporting the inserted microfiche film into said insertion portion formed by said glass lifting means; and control means for controlling said moving means and said film loading means so as to move said supporting means to the loading position, lift the upper glass plate after the completion of said movement of the supporting means and thereafter load microfiche film into the insertion portion between the upper glass plate and the lower glass plate.

12. A microfilm reader as claimed in claim 11, wherein said glass lifting means includes a lever which engages with the upper glass plate of the supporting means upon its positioning at the loading position.

* * * * *